US008816530B2

(12) United States Patent
Callicoat et al.

(10) Patent No.: US 8,816,530 B2
(45) Date of Patent: Aug. 26, 2014

(54) SYSTEM AND METHOD FOR MANAGING ELECTRICAL LOADS IN A VEHICLE

(75) Inventors: Debbi Callicoat, Livonia, MI (US); Matthew Roger DeDona, Northville, MI (US); Mark J. Ferrel, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 13/248,626

(22) Filed: Sep. 29, 2011

(65) Prior Publication Data

US 2013/0082521 A1    Apr. 4, 2013

(51) Int. Cl.
*H02J 1/00* (2006.01)
*H02J 7/00* (2006.01)
*B60L 1/00* (2006.01)
*B60L 15/20* (2006.01)
*B60L 11/18* (2006.01)

(52) U.S. Cl.
CPC .......... *B60L 11/1868* (2013.01); *B60L 2210/10* (2013.01); *B60L 1/00* (2013.01); *H02J 7/0054* (2013.01); *B60L 15/2045* (2013.01)
USPC ........................................... 307/29; 307/10.1

(58) Field of Classification Search
USPC .................................. 307/10.1, 29
See application file for complete search history.

(56) References Cited

U.S. PATENT DOCUMENTS

| 4,125,895 | A  |   | 11/1978 | Buhlmann |        |
|-----------|----|---|---------|----------|--------|
| 5,179,508 | A  |   | 1/1993  | Lange et al. |    |
| 5,477,091 | A  |   | 12/1995 | Fiorina et al. |  |
| 6,633,802 | B2 | * | 10/2003 | Sodoski et al. ................. 701/36 |
| 7,095,137 | B2 | * | 8/2006  | Mackel et al. ................... 307/28 |
| 7,242,169 | B2 |   | 7/2007  | Kanamori et al. |
| 7,447,924 | B2 |   | 11/2008 | May |
| 8,269,641 | B2 | * | 9/2012  | Bauman et al. ............ 340/636.1 |
| 2004/0234825 | A1 |   | 11/2004 | Numao et al. |
| 2005/0167090 | A1 |   | 8/2005  | Kennedy |
| 2006/0176098 | A1 |   | 8/2006  | Chen et al. |

* cited by examiner

*Primary Examiner* — Hal Kaplan
(74) *Attorney, Agent, or Firm* — David B. Kelley; Brooks Kushman P.C.

(57) ABSTRACT

A system and method for managing electrical loads in a vehicle includes a high voltage power source capable of providing electrical power to at least one high voltage load. An electrical converter is operable to receive an input of high voltage power from the high voltage power source and to provide an output of low voltage power to one or more low voltage loads. A control system is in communication with the converter, and it is configured to receive signals from the converter related to the converter output, and cut power to at least one of the low voltage loads when the signals received from the converter indicate that the high voltage power source cannot provide full power to the low voltage loads.

18 Claims, 2 Drawing Sheets

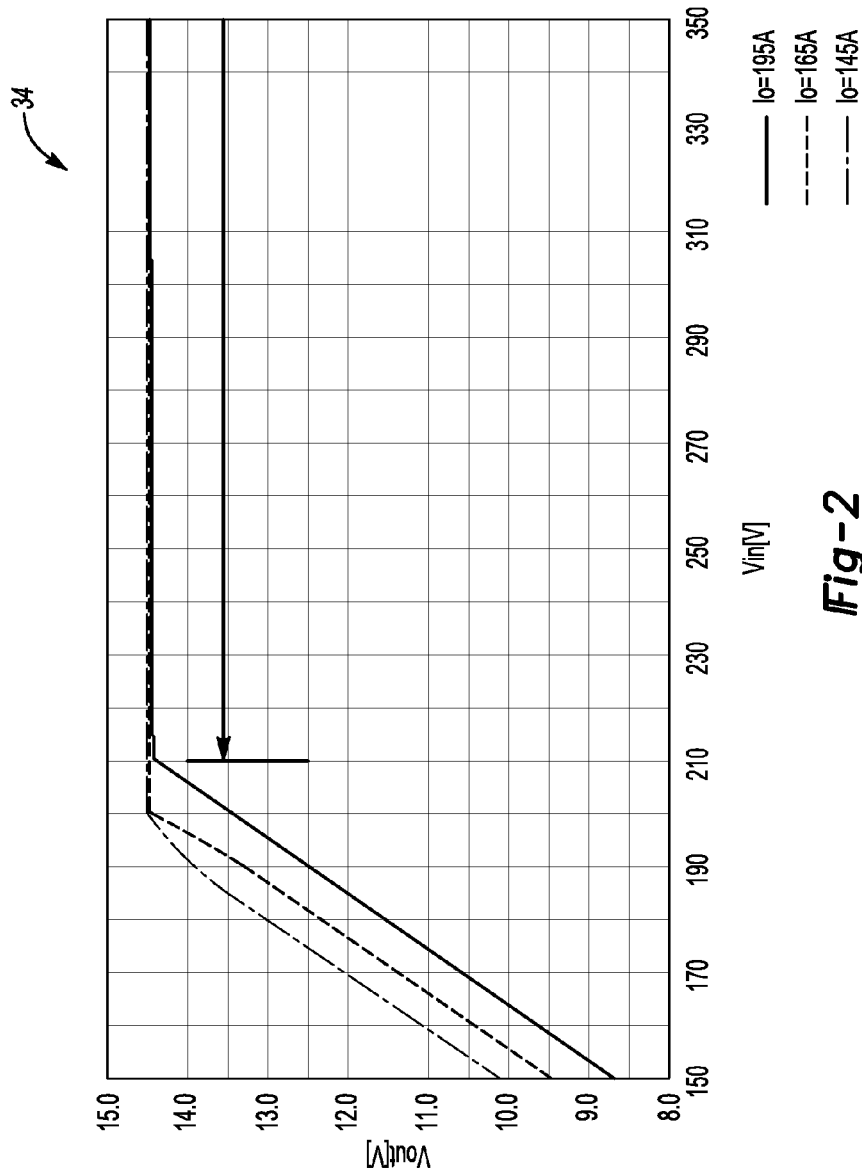
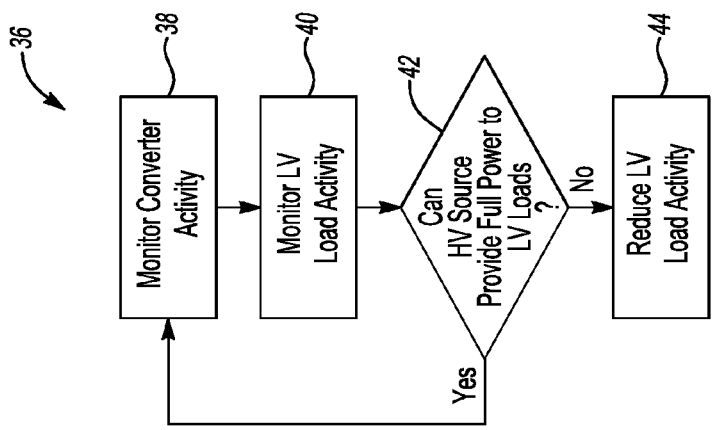
Fig-2
Fig-3

SYSTEM AND METHOD FOR MANAGING ELECTRICAL LOADS IN A VEHICLE

TECHNICAL FIELD

The present invention relates to a system and method for managing electrical loads in a vehicle.

BACKGROUND

As battery technology changes, for example, from a nickel metal hydride chemistry to a lithium ion chemistry, the operating range of the batteries increases. Such batteries may be used for high voltage applications, such as in hybrid electric or electric vehicles. In vehicle applications, the high voltage battery may provide power not only to high voltage loads, but to low voltage loads after the voltage is reduced, for example, through a DC/DC converter.

In addition to the high voltage battery, a hybrid electric or electric vehicle may also have a low voltage battery, which may be used to power vehicle lighting, engine cooling fans, heated seats, and/or other low voltage loads. If the electrical loads in the vehicle reach a certain level, it may not be possible for the high voltage battery to provide all of the power, and the low voltage battery may need to augment the power supplied by the high voltage battery. This could occur, for example, if the high voltage loads were too great, or because of limitations in a DC/DC converter. In such a case, a minimum level of charge may need to be maintained in the low voltage battery to ensure that there is enough power, for example, to illuminate the head lights. If the low voltage battery is drained too low, it may necessitate automatic shut-off of certain electrical loads to maintain the minimum charge within the low voltage battery. When this "reactive" method of electrical load management is employed, the power may be so low as to necessitate shutting off systems in such a way that it is very apparent to the vehicle occupants. For example, if the charge of the low voltage battery reaches a certain level, it may be necessary to shut off an air conditioning system, which may be very noticeable and undesirable for passenger comfort.

Therefore, a need exists for a system and method of electrical load management for a vehicle that is largely transparent to the vehicle occupants.

SUMMARY

Embodiments of the present invention include a system for managing electrical loads in a vehicle. A high voltage power source is capable of providing electrical power to at least one high voltage load, and an electrical converter is operable to receive an input of high voltage power from the high voltage power source and to provide an output of low voltage power to a plurality of low voltage loads. In this way, the high voltage power source provides power to at least some of the low voltage loads. Embodiments of the system also include a control system that includes at least one controller. The control system is in communication with the converter, and is configured to receive signals from the converter related to the converter output. The control system is also configured to cut power to at least one of the low voltage loads when the signals received from the converter indicate that the high voltage power source cannot provide full power to the low voltage loads.

Embodiments of the invention include a system for managing electrical loads in a vehicle, including a high voltage power source and an electrical converter operable to receive high voltage power from the high voltage power source and to provide low voltage power to at least one low voltage load. The system also includes a controller configured to cut power to at least one of the at least one low voltage load when the high voltage power source cannot provide full power to all of the at least one low voltage load.

Embodiments of the invention also include a method for managing electrical loads in a vehicle that has a high voltage power source capable of providing electrical power to at least one high voltage load and a plurality of low voltage loads. The vehicle also includes an electrical converter operable to receive an input of high voltage power from the high voltage power source, and to provide an output of low voltage power to the low voltage loads. The vehicle further has a control system that includes at least one controller, and which is configured to receive inputs from the converter and control the low voltage loads. Steps of the method may include monitoring activity of the converter, and cutting power to at least one of the low voltage loads when the activity of the converter indicates that the high voltage power source cannot provide full power to the low voltage loads.

Embodiments of the present invention include a method for managing electrical loads in a vehicle that has a high voltage power source, and a converter operable to receive an input from the high voltage power source and provide a low voltage output. Steps of the method include monitoring converter activity, monitoring low voltage load activity, and reducing the low voltage load activity when the high voltage power source cannot provide full power to the low voltage loads and there is at least one low voltage load.

BRIEF DESCRIPTION OF THE DRAWINGS

FIG. 2 shows a graph illustrating the relationship between voltage input and voltage output for a converter that is part of a system of the present invention; and FIG. 3 shows a flow chart illustrating steps in accordance with an embodiment of the present invention.

DETAILED DESCRIPTION

Figure 1:
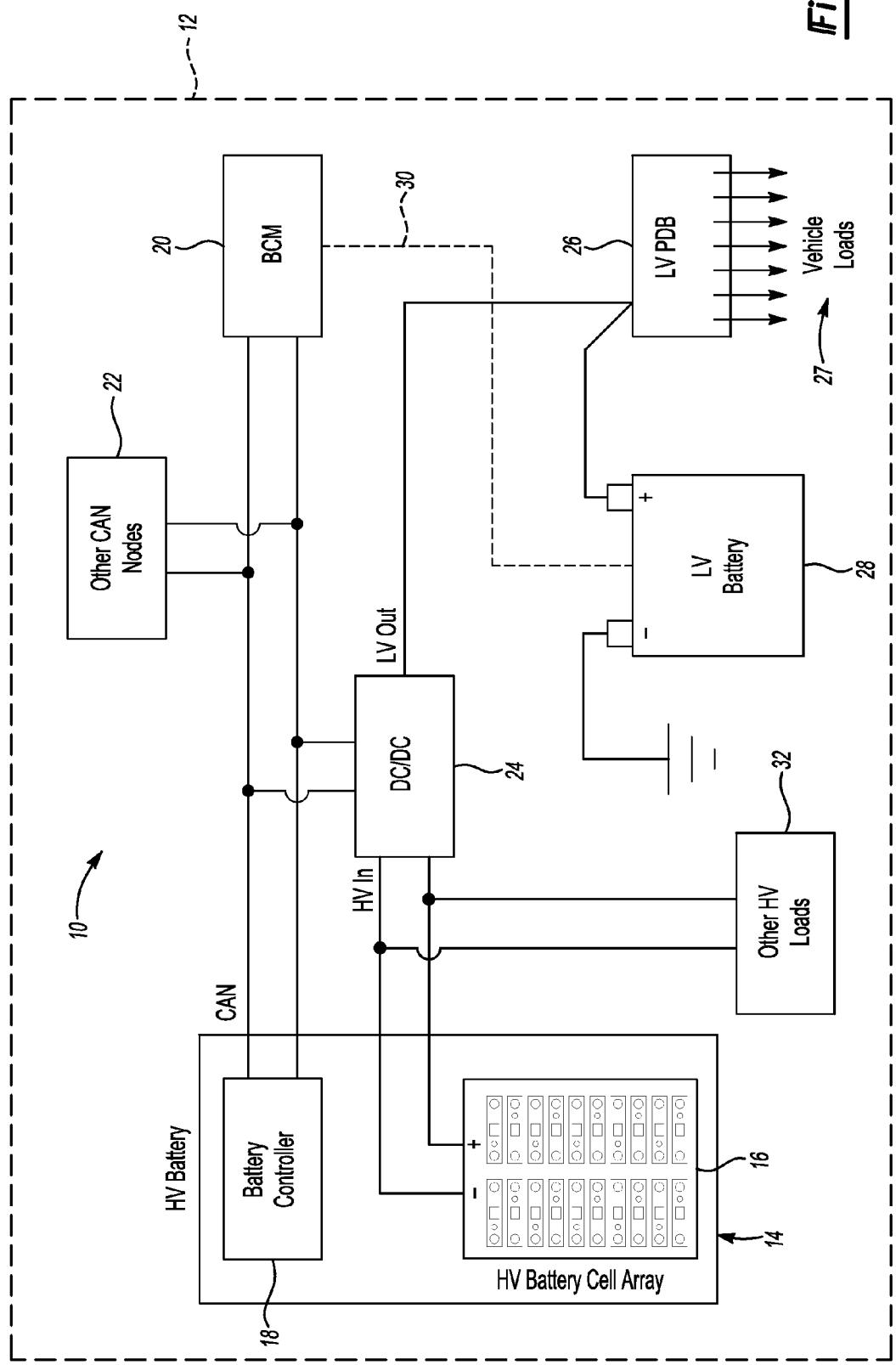
FIG. 1 shows a schematic representation of a system in accordance with embodiments of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a system 10 for managing electrical loads in a vehicle 12 in accordance with embodiments of the present invention. A high voltage power source 14 which, in this embodiment, is a high voltage battery, includes a high voltage battery cell array 16 and a battery controller 18. The battery controller 18 is connected via a controller area network (CAN) to a control system, which includes a body control module (BCM) 20. In addition to communicating with the battery 14, the BCM 20 communicates with other controllers and systems throughout the vehicle 12 as represented schematically by the other CAN nodes 22. The BCM 20 also communicates with a DC/DC converter 24, which is configured to receive a high voltage input from the high voltage battery 14. The converter 24 outputs low voltage power, which is routed to a low voltage power distribution box, or fuse box 26. As illustrated in FIG. 1, the low voltage vehicle loads 27 are connected to the fuse box 26. Also connected to the fuse box 26 is a low voltage battery 28, which can supply power to the fuse box, and the low voltage loads 27, if required. A dashed line 30 is shown connecting the low voltage battery 28 to the BCM 20, and represents a communication between them, which may be part of a method in accordance with embodiments of the invention. In addition to supplying a low voltage power to the low voltage loads 27 through the converter 24, the high voltage battery 14 also provides high voltage power to high voltage loads 32, which may be, for example, a traction motor in an electric or hybrid electric vehicle.

FIG. 2 shows a graph 34, which illustrates the relationship between the high voltage power being input into the converter 24 and the low voltage power being output. As used herein, the distinction between high voltage power and low voltage power is the difference between voltages in the range of 50 volts or less for low voltage power, and 100 volts or more for high voltage power. The graph 34 illustrates three different current levels: 145, 165 and 195 amperes (A). In the example being illustrated, a full power output for low voltage loads 27 is considered to be 14.5 volts (V). As clearly illustrated in FIG. 2, the 14.5 V is available for all three current levels when the high voltage power input into the converter 24 is at least 210 V. Below 210 V, the available output voltage drops off—initially just for the current level of 195 A, but then also for the other two current levels when the high voltage power input drops below 200 V. As explained below, knowing the relationship between the input and output voltage and the requirements of full power for low voltage loads 27, can be beneficial to control strategy methods in accordance with the present invention.

In order to proactively control the low voltage loads 27 in the vehicle 12, the activity of the DC/DC converter 24 is monitored, for example by the BCM 20. This is illustrated in the flow chart 36 shown in FIG. 3, specifically at step 38. The step 40 may also be used where the low voltage activity is monitored, and this is illustrated by the communication line 30 shown in FIG. 1. As used in this context, "monitoring" the converter 24 or the activity of the low voltage loads 27, can be as simple as receiving a signal or signals related to inputs, outputs, or some other parameter that provides the desired information. Based on the information it receives, the BCM 20 determines whether the high voltage battery 14 can provide full power to the low voltage loads 27.

If it is determined at decision block 42 that the high voltage battery 14 is capable of providing full power to the low voltage loads 27, the method returns to step 38, where the converter activity is monitored. If, however, the high voltage battery 14 is not capable of providing full power to the low voltage loads 27, a method of the present invention reduces the low voltage load activity—see step 44.

Embodiments of the present invention are configured to cut power to one or more of the low voltage loads 27 when a high voltage power source, such as the battery 14 cannot provide full power to the low voltage loads 27. This control strategy may be implemented by a controller, such as the BCM 20, alone or in conjunction with other controllers connected, for example, through a CAN. Because embodiments of the present invention make decisions based on the activity of a converter, such as the converter 24, power to one or more low voltage loads 27 can be cut prior to a low voltage power source, such as the battery 28, being used to augment the power received from the high voltage power source. This allows the power to the low voltage loads 27 to be cut in a manner that is virtually transparent to a vehicle operator. For example, when the control strategy first determines that the high voltage power source cannot provide full power to the low voltage loads 27, a first "load shedding strategy" may be employed, whereby selective low voltage loads 27 are terminated. These may include, for example, power to one or more heated seats in the vehicle, and/or a reduction in speed of a heater fan. The first load shedding strategy can be implemented in such a way that certain low voltage loads 27 are terminated or reduced, so that the high voltage power source can provide full power to all of the remaining low voltage loads 27. Then, once the high voltage power source receives an additional charge—for example, through regenerative braking—and is again able to provide full power to all of the low voltage loads 27, the previously terminated or reduced load or loads can be reinstated at full power.

As noted above, part of the determination of when load shedding is desired includes monitoring the activity of an electrical converter, such as the converter 24 shown in FIG. 1. One way to accomplish this is to monitor the low voltage output, knowing that a requisite minimum level must be met in order for all of the low voltage loads 27 to receive full power. Embodiments of the present invention employ another strategy, however, in that it is the high voltage input into the converter 24 that is analyzed. This is possible, because as shown in the graph 34 in FIG. 2 there is a known relationship between the output voltage and the input voltage. Using the examples from FIGS. 1 and 2 the BCM 20 might implement a first load shedding strategy when the high voltage input into the converter 24 was at or below 210 V. If it was known that the current draw on the high voltage battery was less than 195 A, for example, 145 A or 165 A, then the BCM might wait until the high voltage input was at or below 200 V prior to implementing the first load shedding strategy. In this way, embodiments of the present invention can be especially proactive in shedding low voltage loads 27 prior to requiring assistance from the low voltage battery and undesirable reduction in accessories that is noticeable to the vehicle occupants.

Embodiments of the present invention may also include a number of features to further refine the load shedding strategy. For example, a high voltage power source, such as the battery 14 shown in FIG. 1, may be subject to transient reductions in power that make it momentarily unable to provide full power for all of the low voltage loads 27. If the load shedding strategy is quickly implemented by the BCM 20, low voltage loads 27 may be shed unnecessarily if the high voltage battery very quickly returns to a higher level of power. As noted above, the first load shedding strategy focuses on those loads that are generally not noticed by the vehicle occupants, and therefore this transient response does not detract from the effectiveness of the strategy. If, however, it is desired to reduce the effects of transient power fluctuations in a high voltage power source, it is possible to further implement the step of delaying the start of the load shedding strategy until the control system has received a signal indicating low power in the high voltage battery for some predetermined period of time. In such a case, the predetermined time period would be relatively short, so as to ensure that the control strategy was still proactive and the low voltage loads 27 did not become such a burden as to draw on power from the low voltage power source.

As discussed above with regard to FIG. 1, a low voltage power source, such as the low voltage battery 28, can communicate with a control system, such as the BCM 20. In such a case, the BCM 20 may monitor low voltage load activity by measuring one or more parameters of the low voltage battery 28. Thus, the load shedding strategy may be indicated by signals the BCM 20 receives from the converter 24, but it is not implemented unless there are low voltage loads 27 present that are subject to the first load shedding strategy. In some cases, there may not be any low voltage loads 27 available to terminate or reduce, and in other situations there may be low voltage loads 27 available, but these are not included in the first load shedding strategy. For example, if an air conditioning system was active, and the high voltage battery 14 was unable to provide full power to the air conditioning system, and considering that less than full power could be detrimental to one or more components, such as a compressor, a second load shedding strategy may need to be implemented. This is because an air conditioning system may not be part of a first load shedding strategy, in that terminating this load would very likely be noticeable by the vehicle occupants, and considered undesirable. In this case, a second load shedding strategy may be implemented, whereby the BCM 20 first provides an indicator to the vehicle operator showing that it is necessary to terminate some vehicle loads. Then, the BCM 20 could terminate power to the air conditioning system, and the vehicle operator would be expecting it, and would not consider it a system failure. This second load shedding strategy can be implemented in situations where there are no loads subject to the first load shedding strategy, or it can be implemented after all of the loads have been terminated or reduced according to the first load shedding strategy, but the high voltage battery is still unable to provide full power to the remaining low voltage loads 27.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for managing electrical loads in a vehicle, comprising:
    a high voltage power source;
    an electrical converter operable to receive high voltage power from the high voltage power source and to provide low voltage power to at least one low voltage load; and
    a controller configured to cut power to at least one of the at least one low voltage load when the high voltage power source cannot provide full power to all of the at least one low voltage load.

2. The system of claim 1, wherein the controller is configured to cut power to at least one of the at least one low voltage load such that the high voltage power source can provide full power to the remaining at least one low voltage load.

3. The system of claim 1, further comprising a low voltage power source capable of providing power to the at least one low voltage load, and wherein the controller cuts power to at least one of the at least one low voltage load prior to the low voltage power source outputting power to the at least one low voltage load.

4. The system of claim 1, wherein the controller is further configured to allow power to the at least one of the at least one low voltage load after its power was cut, when signals received from the converter indicate that the output from the converter can provide full power to the at least one low voltage load.

5. The system of claim 1, wherein the controller is further configured to delay the step of cutting power to at least one of the at least one low voltage load until the signals received from the converter have been received for a predetermined time.

6. The system of claim 1, wherein there is a known relationship between converter input and converter output, and the signals received by the controller from the converter related to the converter output are signals indicating the converter input from the high voltage power source.

7. The system of claim 1, wherein the controller is further configured to provide an indication to an operator of the vehicle after power has been cut to at least one of the at least one low voltage load and the high voltage power source cannot provide full power to the remaining at least one low voltage load.

8. A method for managing electrical loads in a vehicle having a high voltage power source capable of providing electrical power to at least one high voltage load and a plurality of low voltage loads, an electrical converter operable to receive an input of high voltage power from the high voltage power source and to provide an output of low voltage power to the low voltage loads, and a control system, including at least one controller, configured to receive inputs from the converter and control the low voltage loads, the method comprising:
    monitoring activity of the converter; and
    cutting power to at least one of the low voltage loads when the activity of the converter indicates that the high voltage power source cannot provide full power to the low voltage loads.

9. The method of claim 8, wherein the converter output is related to the converter input, and the step of monitoring activity of the converter includes monitoring the input to the converter to determine when the output from the converter is too low for the high voltage power source to provide full power output to the low voltage loads.

10. The method of claim 9, further comprising providing power to the at least one of the low voltage loads after its power was cut, when the input from the high voltage power source to the converter increases so that the output from the converter is large enough to provide full power to the low voltage loads.

11. The method of claim 8, wherein the vehicle further has a low voltage power source capable of providing power to the low voltage loads, and the step of cutting power to the at least one of the low voltage loads is performed prior to the low voltage power source outputting power to the low voltage loads.

12. The method of claim 8, wherein power is cut to at least one of the low voltage loads such that the high voltage power source can provide full power to the remaining low voltage loads.

13. The method of claim 8, further comprising providing an indicator to an operator of the vehicle after power has been cut to at least one of the low voltage loads and the high voltage power source cannot provide full power to the remaining low voltage loads.

14. A method for managing electrical loads in a vehicle having a high voltage power source, a converter operable to receive an input from the high voltage power source and provide a low voltage output, comprising:
    monitoring converter activity;
    monitoring low voltage load activity; and
    reducing the low voltage load activity when the high voltage power source cannot provide full power to the low voltage loads and there is at least one low voltage load.

15. The method of claim 14, wherein the vehicle further has a low voltage power source capable of providing power to the low voltage loads, and the step of reducing the low voltage load activity is performed prior to the low voltage power source outputting power to the low voltage loads.

16. The method of claim 14, wherein the step of reducing the low voltage load activity includes cutting power to at least one of the low voltage loads, the method further comprising providing power to the at least one of the low voltage loads after its power was cut, when the converter activity indicates that the high voltage power source is capable of providing full power to the low voltage loads.

17. The method of claim 14, wherein the step of reducing the low voltage load activity includes cutting power to at least one of the low voltage loads such that the high voltage power source can provide full power to the remaining low voltage loads.

18. The method of claim 14, further comprising providing an indicator to an operator of the vehicle after the low voltage activity has been reduced and the high voltage power source cannot provide full power to the remaining low voltage loads.

* * * * *